United States Patent
Nennemann et al.

(10) Patent No.: US 8,278,399 B2
(45) Date of Patent: Oct. 2, 2012

(54) POLYSILOXANE-MODIFIED POLYISOCYANATES, PROCESSES FOR PREPARING THE SAME, AND POLYURETHANES CONTAINING THE SAME

(75) Inventors: Arno Nennemann, Bergisch Gladbach (DE); Markus Mechtel, Bergisch Gladbach (DE); Thomas Klimmasch, Leverkusen (DE); Meike Niesten, Köln (DD)

(73) Assignee: Bayer MaterialScience AG, Leverkusen (DE)

( * ) Notice: Subject to any disclaimer, the term of this patent is extended or adjusted under 35 U.S.C. 154(b) by 615 days.

(21) Appl. No.: 12/267,634

(22) Filed: Nov. 10, 2008

(65) Prior Publication Data
US 2009/0124766 A1    May 14, 2009

(30) Foreign Application Priority Data
Nov. 8, 2007   (EP) .................................. 07021691

(51) Int. Cl.
*C08L 83/06*   (2006.01)
(52) U.S. Cl. ........................................ 525/474; 528/28
(58) Field of Classification Search ............... 525/474; 528/28
See application file for complete search history.

(56) References Cited

U.S. PATENT DOCUMENTS

| | | | |
|---|---|---|---|
| 4,482,721 A | 11/1984 | Wegner et al. | |
| 5,294,665 A | 3/1994 | Pedain et al. | |
| 5,621,063 A | 4/1997 | Wolf et al. | |
| 2005/0222368 A1* | 10/2005 | Reiners et al. | 528/73 |
| 2007/0032623 A1 | 2/2007 | Roesler et al. | |
| 2007/0054134 A1* | 3/2007 | Niesten et al. | 428/447 |
| 2007/0055016 A1 | 3/2007 | Niesten et al. | |

FOREIGN PATENT DOCUMENTS

| | | |
|---|---|---|
| CA | 2094618 C | 7/2003 |
| CA | 2431829 A1 | 12/2003 |
| DE | 10226927 A1 | 12/2003 |
| EP | 0159117 A1 | 10/1985 |
| EP | 0566953 A1 | 10/1993 |
| EP | 0576952 A2 | 1/1994 |
| EP | 0744423 A1 | 11/1996 |
| WO | WO-97/12924 A1 | 4/1997 |
| WO | 03 002635 * | 1/2003 |
| WO | WO-2007/025670 A1 | 3/2007 |
| WO | WO-2007/025671 A1 | 3/2007 |

* cited by examiner

*Primary Examiner* — Kuo-Liang Peng
(74) *Attorney, Agent, or Firm* — Connolly Bove Lodge & Hutz LLP

(57) ABSTRACT

Processes for preparing siloxane-modified polyisocyanates, the processes comprising: providing a polyisocyanate reactant; and reacting the polyisocyanate reactant with a hydroxyl-containing siloxane having a number-average molecular weight of 200 to 3000 g/mol and an average OH functionality of greater than or equal to 1.8, and corresponding to the general formula (I):

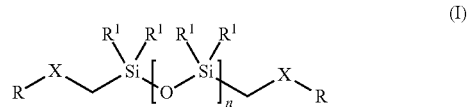

wherein X represents an aliphatic, unbranched or branched $C_1$ to $C_{20}$ radical optionally containing ether groups; R represents a hydroxyl-functional radical; $R^1$ represents a hydrogen or an optionally heteroatom-containing $C_1$ to $C_{20}$ hydrocarbon radical; and n is 1 to 40; siloxane-modified polyisocyanates prepared thereby, and uses therefor.

8 Claims, No Drawings

POLYSILOXANE-MODIFIED POLYISOCYANATES, PROCESSES FOR PREPARING THE SAME, AND POLYURETHANES CONTAINING THE SAME

BACKGROUND OF THE INVENTION

U.S. Patent Application Publication No. 2007/0032623, the entire contents of which are hereby incorporated herein by reference, discloses polyisocyanate mixtures which by reaction of polyisocyanates with siloxanes which contain carbon-bonded hydroxyl groups. They are suitable as crosslinkers for producing coatings having low surface tension.

International Patent Publication No. WO2007025671, the entire contents of which are hereby incorporated herein by reference, discloses compositions which comprise specific OH-group-functional polydimethylsiloxanes and also polyols or polyamines and polyisocyanates. Depending on application technology, however, these compositions are not suitable for producing haze-free coating films having good easy-to-clean properties. Direct reaction of polyisocyanates with these specific siloxanes and their use as polyisocyanate crosslinkers, furthermore, are not described.

BRIEF SUMMARY OF THE INVENTION

The present invention relates to innovative modified polyisocyanates comprising hydroxyl-functional polydimethylsiloxane units and also to their use in coating compositions and adhesives.

Surprisingly it has now been found that, by reaction of certain OH-group-functional polydimethylsiloxanes with polyisocyanates, gelling-free, polysiloxane-containing polyisocyanates can be prepared which then, in the coating operation with polyhydroxy compounds, exhibit more homogeneous film formation and also improved performance properties in comparison to the formulation via the polyol.

The present invention relates, in general, to processes for preparing siloxane-modified polyisocyanates, wherein
A) polyisocyanates are reacted with
B) hydroxyl-containing siloxanes having number-average molecular weights of 200 to 3000 g/mol and an average OH functionality of greater than or equal to 1.8, of formula (I)

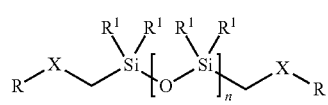

(I)

wherein X represents an aliphatic, unbranched or branched $C_1$ to $C_{20}$ radical optionally containing ether groups, R represents a hydroxyl-functional radical, $R^1$ represents a hydrogen or an optionally heteroatom-containing $C_1$ to $C_{20}$ hydrocarbon radical and n represents 1 to 40; and
C) if desired, blocking agents.

One embodiment of the present invention includes a process comprising:
providing a polyisocyanate reactant; and
reacting the polyisocyanate reactant with a hydroxyl-containing siloxane having a number-average molecular weight of 200 to 3000 g/mol and an average OH functionality of greater than or equal to 1.8, and corresponding to the general formula (I):

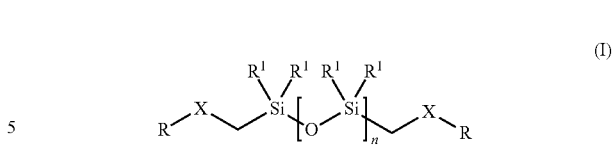

(I)

wherein each X independently represents an aliphatic, unbranched or branched $C_1$ to $C_{10}$ radical optionally containing one or more ether groups selected from the group consisting of —[—[O—CH$_2$—CHZ]$_n$—O—]— wherein each Z independently represents an H or a methyl group and n is 1 to 12, and —[—CH2-O—(CH2)$_r$-]- wherein r is 1 to 4;
wherein each R independently represents a hydroxyl-functional radical selected from the group consisting of: (i) hydroxyfunctional carbon acid ester moieties of the formula (a)

(a)

wherein x is 3 to 5; and (ii) hydroxyalkyl-functional amino group of Formula (b)

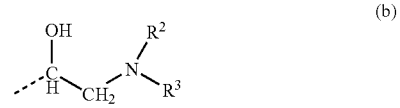

(b)

wherein $R^2$ represents a substituent selected from the group consisting of H, methyl, ethyl, n-propyl, iso-propyl, cyclohexyl radicals, 2-hydroxyethyl, 2-hydroxypropyl, and 3-hydroxypropyl, and wherein $R^3$ represents a substituent selected from the group consisting of 2-hydroxyethyl, 2-hydroxypropyl and 3-hydroxypropyl; each $R^1$ independently represents a hydrogen or an optionally heteroatom-containing $C_1$ to $C_{10}$ hydrocarbon radical; and n is 1 to 40.

Likewise provided by the invention are polyurethane systems comprising such siloxane-modified polyisocyanates and at least one polyol or polyamine. An additional embodiment of the present invention includes siloxane-modified polyisocyanates prepared by the processes of the present invention. Another embodiment of the present invention includes polyurethane system comprising a siloxane-modified polyisocyanate according to the invention.

DETAILED DESCRIPTION OF THE INVENTION

As used herein, the singular terms "a" and "the" are synonymous and used interchangeably with "one or more" and "at least one," unless the language and/or context clearly indicates otherwise. Accordingly, for example, reference to "a polyisocyanate reactant" herein or in the appended claims can refer to a single polyisocyante reactant or more than one polyisocyante reactant. Additionally, all numerical values, unless otherwise specifically noted, are understood to be modified by the word "about."

In A) it is possible in principle to use all of the NCO-functional compounds that are known per se to the skilled person and have more than one NCO group per molecule. These compounds preferably have NCO functionalities of 2.3 to 4.5, NCO group contents of 11.0% to 24.0% by weight, and monomeric diisocyanate contents of preferably less than 1% by weight, more preferably less than 0.5% by weight.

Polyisocyanates of this kind are obtainable by modification of simple aliphatic, cycloaliphatic, araliphatic and/or aromatic diisocyanates and may contain uretdione, isocyanurate, allophanate, biuret, iminooxadiazinedione and/or oxadiazinetrione structures. Moreover, polyisocyanates of this kind can be used as NCO-containing prepolymers. Polyisocyanates of this kind are described, for example, in Laas et al. (1994), J. prakt. Chem. 336, 185-200 or in Bock (1999), Polyurethane für Lacke und Beschichtungen, Vincentz Verlag, Hannover, pp. 21-27, the entire contents of each of which are hereby incorporated herein by reference.

Suitable diisocyanates for preparing such polyisocyanates are any diisocyanates of the molecular weight range 140 to 400 g/mol that are obtainable by phosgenation or by phosgene-free processes, as for example by thermal urethane cleavage, and have aliphatically, cycloaliphatically, araliphatically and/or aromatically attached isocyanate groups, such as 1,4-diisocyanatobutane, 1,6-diisocyanatohexane (HDI), 2-methyl-1,5-diisocyanatopentane, 1,5-diisocyanato-2,2-dimethylpentane, 2,2,4- and/or 2,4,4-trimethyl-1,6-diisocyanatohexane, 1,10-diisocyanatodecane, 1,3- and 1,4-diisocyanatocyclohexane, 1,3- and 1,4-bis(isocyanatomethyl)cyclohexane, 1-isocyanato-3,3,5-trimethyl-5-isocyanatomethylcyclohexane(isophorone diisocyanate, IPDI), 4,4'-diisocyanatodicyclohexylmethane, 1-isocyanato-1-methyl-4(3)isocyanatomethylcyclohexane, bis(isocyanatomethyl)norbornane, 1,3- and 1,4-bis(1-isocyanato-1-methylethyl)benzene (TMXDI), 2,4- and 2,6-diisocyanatotoluene (TDI), 2,4'- and 4,4'-diisocyanatodiphenylmethane (MDI), 1,5-diisocyanatonaphthalene or any desired mixtures of such diisocyanates.

Preferably in A) polyisocyanates of the aforementioned kind based on IPDI, MDI, TDI, HDI or mixtures thereof are used. Particular preference is given to using aliphatic polyisocyanates based on HDI and IPDI.

The polyorganosiloxanes B) of the general formula (I) containing hydroxyl groups preferably have number-average molecular weights of from 250 to 2,250 g/mol, particularly preferably from 350 to 1,500 g/mol.

The polyorganosiloxanes B) of the general formula (I) containing hydroxyl groups are obtainable by reacting corresponding epoxy-functional polyorganosiloxanes with hydroxyalkyl-functional amines, preferably in a stoichiometric ratio of epoxide group to amino function.

The epoxy-functional siloxanes employed for this preferably contain 1 to 4, particularly preferably 2 epoxide groups per molecule. They furthermore have number-average molecular weights of from 150 to 2,000 g/mol, preferably from 250 to 1,500 g/mol, very particularly preferably from 250 to 1,250 g/mol.

Preferred epoxy-functional siloxanes are α,ω-epoxysiloxanes corresponding to the formula (III)

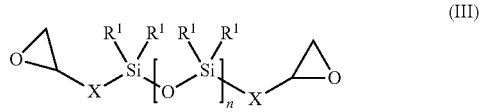

in which X is an aliphatic, optionally branched C1 to C10 radical, preferably a methyl, ethyl, n-propyl, iso-propyl, n-butyl, iso-butyl or tert-butyl radical, particularly preferably a methyl radical, or a [—CH2-O—(CH2)r]-Si unit, where r=1 to 4, preferably where r=3, R1 can be identical or different and is hydrogen or a C1- to C10-hydrocarbon radical optionally containing hetero atoms and n is 1 to 40.

R1 in the formulae (I) and (III) is preferably phenyl, alkyl, aralkyl, fluoroalkyl, alkylethylene-copropylene oxide groups or hydrogen, wherein phenyl or methyl groups are particularly preferred. R1 is very particularly preferably a methyl group.

Suitable compounds corresponding to formula (III) are, for example, those of the formulae IIIa) and IIIb):

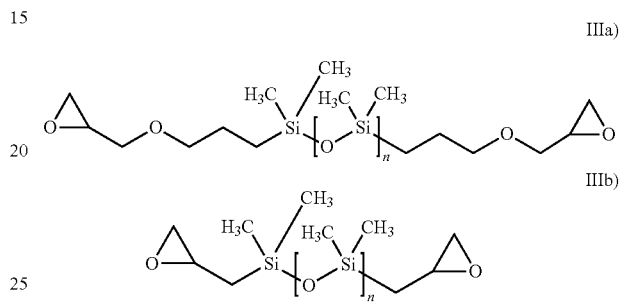

in which n is an integer from 4 to 12, preferably from 6 to 9.

Examples of commercially obtainable products of this series are, for example, CoatOsil® 2810 (Momentive Performance Materials, Leverkusen, Germany) or Tegomer® E-Si2330 (Tego Chemie Service GmbH, Essen, Germany).

Suitable hydroxyalkyl-functional amines correspond to the general formula (IV)

in which R2 can be an H, a methyl, ethyl, n-propyl, iso-propyl or cyclohexyl radical or a 2-hydroxyethyl, 2-hydroxypropyl or 3-hydroxypropyl radical and R3 can be a 2-hydroxyethyl, 2-hydroxypropyl or 3-hydroxypropyl radical.

Preferred hydroxyalkylamines are ethanolamine, propanolamine, diethanolamine, diisopropanolamine, methylethanolamine, ethylethanolamine, propylethanolamine and cyclohexylethanolamine. Diethanolamine, diisopropanolamine or cyclohexylethanolamine are particularly preferred. Diethanolamine is very particularly preferred.

For the preparation of component B), the epoxy-functional siloxane of the general formula (III) is optionally initially introduced into a solvent and then reacted with the required amount of the hydroxyalkylamine (IV) or a mixture of several hydroxyalkylamines (IV). The reaction temperature is typically 20 to 150° C. and is continued until no further free epoxide groups are detectable.

Hydroxyalkyl-functional siloxanes B) of the formula (I) which have been obtained by the abovementioned reaction of epoxy-functional polyorganosiloxanes with hydroxyalkylamines are particularly preferably employed.

Particularly preferred polyorganosiloxanes B) are, for example, those of the formulae Ia) to Ih):

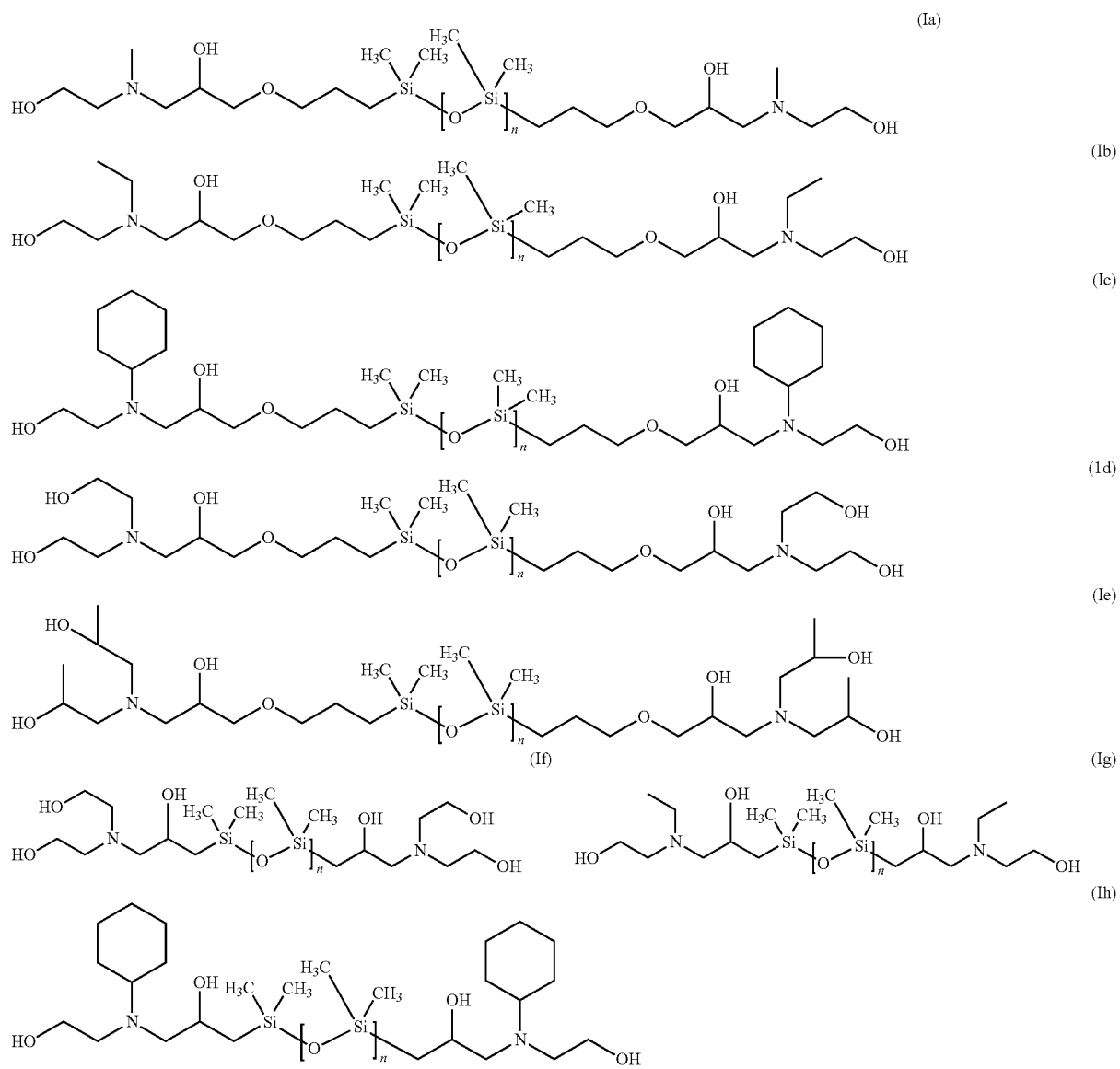

wherein n 4 to 12, preferably 6 to 9.

Siloxanes which are likewise suitable as component B) are, for example, hydroxyalkyl-functional siloxanes (α,ω-carbinols) corresponding to the formula (V)

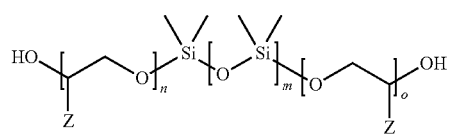

(V)

in which m is 5 to 15, Z is H or methyl, preferably H and n, o is 1 to 12, preferably 1 to 5.

Hydroxyalkyl-functional siloxanes (α,ω-carbinols) of the formula (V) preferably have number-average molecular weights of from 250 to 2,250 g/mol, particularly preferably from 250 to 1,500 g/mol, very particularly preferably from 250 to 1,250 g/mol. Examples of commercially obtainable hydroxyalkyl-functional siloxanes of the type mentioned are Baysilone® OF-OH 502 3 and 6% strength (GE-Bayer Silicones, Leverkusen, Germany).

A further route for the preparation of suitable hydroxyfunctional polyorganosiloxanes corresponding to component B) is the reaction of the abovementioned hydroxyalkyl-functional siloxanes of the α,ω-carbinol type of the formula (V) with cyclic lactones. Suitable cyclic lactones are, for example, ε-caprolactone, γ-butyrolactone or valerolactone.

This is effected in a ratio of OH groups to lactone functions of from 1:2 to 2:1, preferably in a stoichiometric ratio of OH groups to lactone functions. The hydroxyalkyl-functional siloxanes B) obtained in this way are preferred. Examples of such a compound are polyorganosiloxanes B) of the general formula (VI)

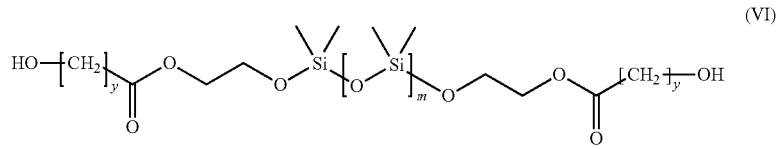

(VI)

in which m can be 5 to 15 and y can be 2 to 5, preferably 5.

Preferably R in formula (I) is a hydroxyl-functional carboxylic ester of the formula (a)

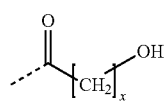

(a)

wherein x=is 3 to 5, preferably 5, or a hydroxyalkyl-functional amino group of the formula (b)

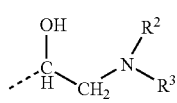

(b)

wherein $R^2$ represents an aliphatic linear, branched or cyclic hydroxyalkyl radical; $R^3$ represents hydrogen or corresponding to the definition of the radical $R^2$.

With particular preference R in formula (I) is a hydroxyalkyl-functional amino group of the aforementioned type.

$R^1$ in the formulae (I) and (II) is preferably phenyl, alkyl, aralkyl, fluoroalkyl, alkylethylene-co-propylene oxide groups or hydrogen, particular preference being given to phenyl and methyl. It is immaterial in this context whether the radicals R1 are identical or different groups.

With very particular preference R1 is a methyl group, and so the units in question are pure dimethylsilyl units.

Hydroxyl-containing siloxanes of component B) that are obtainable as described above preferably have number-average molecular weights of 250 to 2250 g/mol, more preferably 250 to 1500 g/mol.

In the context of the modification the ratio of free NCO groups of the isocyanate to be modified to the NCO-reactive OH groups of the hydroxyl-containing siloxane of the formula (I) is preferably 1:0.001 to 1:0.4, more preferably 1:0.01 to 1:0.2.

Following the siloxane modification, the free NCO groups of the polyisocyanates thus modified can also be modified further. This may be, for example, a partial or complete blocking of the free NCO groups with blocking agents known per se to the skilled person (with regard to the blocking of isocyanate groups see, e.g., German Patent Publication No. DE10226927, European Patent Publication No. EP0576952, European Patent Publication No. EP 0566953, European Patent Publication No. EP0159117, U.S. Pat. No. 4,482,721, International Patent Publication No. WO 97/12924 and/or European Patent Publication No. EP0744423, the entire contents of each of which are hereby incorporated herein by reference). Examples include butanone oxime, ε-caprolactam, methyl ethyl ketoxime, malonic esters, secondary amines, and also triazole derivatives and pyrazole derivatives.

Blocking of the NCO groups has the advantage that the siloxane-modified polyisocyanates based thereon tend to have a better stability towards gelling than similar products which still possess free NCO groups. This applies more particularly at NCO:OH reaction ratios of 1:0.1 to 1:0.4.

The reaction of hydroxyl-functional polydimethylsiloxane and polyisocyanate takes place at 0-100° C., preferably at 10-90° C., more preferably at 15-80° C. If desired it is possible to use common catalysts which catalyze the reaction of R—OH with NCO.

In the process of the invention it is possible in principle to add the solvents known per se to the skilled worker and inert towards NCO groups at any point in time. These are, for example, solvents such as butyl acetate, 1-methoxy-2-propyl acetate, ethyl acetate, toluene, xylene, solvent naphtha, and mixtures thereof.

Polyurethane systems which comprise modified polyisocyanates of the kind described above may be formulated as 1-component or 2-component PU systems, depending on whether the NCO groups are blocked.

Besides the polysiloxane-modified polyisocyanates of the invention, the polyurethane systems of the present invention comprise polyhydroxy and/or polyamine compounds for crosslinking. In addition there may be further polyisocyanates, different from the polyisocyanates of the invention, and also auxiliaries and additives present.

Suitable polyhydroxyl compounds are, for example, tri- and/or tetra-functional alcohols and/or the polyether polyols, polyester polyols and/or polyacrylate polyols that are typical per se in coatings technology.

Furthermore, for the purpose of crosslinking, it is also possible to use polyurethanes or polyureas which are crosslinkable with polyisocyanates by virtue of the active hydrogen atoms that are present in the urethane or urea groups respectively.

Likewise possible is the use of polyamines, whose amino groups may be blocked, such as polyketimines, polyaldimines or oxazolanes.

For the crosslinking of the polyisocyanates of the invention it is preferred to use polyacrylate polyols and polyester polyols.

As auxiliaries and additives it is possible to use solvents such as butyl acetate, ethyl acetate, 1-methoxy-2-propyl acetate, toluene, 2-butanone, xylene, 1,4-dioxane, diacetone alcohol, N-methylpyrrolidone, dimethylacetamide, dimethylformamide, dimethyl sulphoxide or any desired mixtures of such solvents. Preferred solvents are butyl acetate, 2-ethyl acetate and diacetoalcohol.

In addition it is possible for there to be present as auxiliaries and additives such as organic or inorganic pigments, light stabilizers, coatings additives, such as dispersing, flow control, thickening, defoaming and other auxiliaries, tackifiers, fungicides, bactericides, stabilizers or inhibitors and catalysts.

The application of the polyurethane systems of the invention to substrates takes place in accordance with the application methods that are typical within coatings technology, such as spraying, flooding, dipping, spin coating or knife coating, for example.

The polysiloxane-modified polyisocyanates of the invention and also the polyurethane systems based on them are suitable for producing polyurethane adhesives, polyurethane coating materials and polyurethane coatings.

The invention will now be described in further detail with reference to the following non-limiting examples.

EXAMPLES

Desmophen® A 870 Polyacrylate polyol, 70% in butyl acetate, OH number 97, OH content 2.95%, viscosity at 23° C. about 3500 mPas, commercial product of BayerMaterialScience AG, Leverkusen, DE Desmodur® N 3300: Hexamethylene diisocyanate trimer; NCO content 21.8±0.3% by weight, viscosity at 23° C. about 3000 mPas, Bayer MaterialScience AG, Leverkusen, DE Desmodur® VP LS 2253: 3,5-Dimethylpyrazole-blocked polyisocyanate (trimer) based on HDI; 75% in SN 100/MPA (17:8), viscosity at 23° C. about 3600 mPas, blocked NCO content 10.5%, equivalent weight 400, Bayer MaterialScience AG, Leverkusen, DE Baysilone OF/OH 502 6%: Organofunctional polydimethylsiloxane, OH content 5.5% to 6.5%, GE-Bayer Silicones (Momentive), Leverkusen, DE.

Coatosil® 2810: Epoxy-modified silicone fluid, epoxide content 11.4% by weight, Momentive Performance Materials, Leverkusen, DE The hydroxyl number (OH number) was determined in accordance with DIN 53240-2.

The viscosity determination took place by means of the "RotoVisco 1" rotational viscometer from Haake, Germany, in accordance with DIN EN ISO 3219.

The determination of the acid number took place in accordance with DIN EN ISO 2114.

The colour number determination (APHA) took place in accordance with DIN EN 1557.

The determination of the NCO content took place in accordance with DIN EN ISO 11909.

Pendulum damping (König) in accordance with DIN EN ISO 1522 "pendulum damping test"

Scratch resistance, laboratory wash unit (wet marring) in accordance with DIN EN ISO 20566 "coating materials—Testing of the scratch resistance of a coating system using a laboratory wash unit"

Determination of Solvent Resistance

This test was used to find the resistance of a cured coating film to various solvents. This is done by leaving the solvents to act on the coating surface for a defined time. Subsequently an assessment is made, visually and by touching with the hand, as to whether and, if so, which changes have occurred on the test area. The coating film is generally located on a glass plate; other substrates are likewise possible. The test tube stand with the solvents xylene, 1-methoxy-2-propyl acetate, ethyl acetate and acetone (see below) is placed on the coating surface in such a way that the openings of the test tubes with the cotton wool plugs are lying on the film. The important factor is the resultant wetting of the coating surface by the solvent. After the defined exposure time of the solvents, of 1 minute and 5 minutes, the test tube stand is removed from the coating surface. Subsequently the residues of solvent are removed immediately by means of an absorbent paper or textile cloth. The area under test is then inspected immediately, after cautious scratching with the fingernail, for changes, visually. The following gradations are distinguished:

| | |
|---|---|
| 0 = unchanged | |
| 1 = trace changed | only visible change |
| 2 = slightly changed | softening perceptible by fingernail can be ascertained |
| 3 = markedly changed | severe softening can be ascertained with the fingernail |
| 4 = severely changed | with the fingernail down to the substrate |
| 5 = destroyed | coating surface destroyed without external exposure |

The gradations of evaluation found for the solvents indicated above are documented in the following order:

| | |
|---|---|
| Example | 0000 (no change) |
| Example | 0001 (visible change only in the case of acetone) |

The numerical sequence here describes the sequence of solvents tested (xylene, methoxypropyl acetate, ethyl acetate, acetone)

Determination of Scratch Resistance by Means of the Hammer Test (Dry Marring)

Marring is carried out using a hammer (weight: 800 g without shaft) whose flat side has been mounted with steel wool or polishing paper. For this purpose the hammer is carefully placed on to the coated surface at right angles and passed in a track over the coating without tipping and without additional physical force. 10 back-and-forth strokes are performed. After exposure to the marring medium, the area under test is cleaned with a soft cloth and then the gloss to DIN EN ISO 2813 is measured transversely to the direction of marring. The regions subjected to measurement must be homogeneous.

Example 1a

Hydroxy-Functional Polydimethylsiloxane

In accordance with WO 2007025670, 770 g of the epoxy-functional polydimethylsiloxane Coatosil® 2810, of the formula

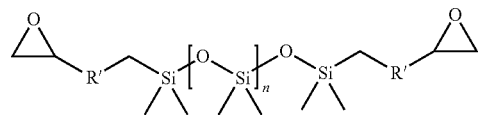

were introduced, preheated to 80° C. and admixed with 231 g of diethanolamine (epoxide/amine equivalent ratio 1:1). This mixture was subsequently stirred at 100° C. for 2 hours. The product had an epoxide content <0.01%, an OH number of about 365 mg KOH/g (11.1%) and a viscosity at 23° C. of about 2900 mPas.

Example 1b-1c

In the same way as for Example 2a, the reaction of the bisepoxide was carried out with different amines. After the reaction had subsided the epoxide contents were <0.01%. In some cases the synthesis was carried out in the presence of butyl acetate.

| Example | Amine | Butyl acetate [%] | OH number [mg KOH/g] |
|---|---|---|---|
| 1a | Diethanolamine | — | 365 |
| 1b | 2-Ethylaminoethanol | — | 249 |
| 1c | Cyclohexylaminoethanol | 25 | 116 |

Example 1d 438 g (2 eq) of the PDMS bishydroxide Tegomer H—Si2111 (OH content 3.9%, molar mass 876 g/mol; Degussa AG, Essen, DE) were mixed with 57 g of caprolactone (1 eq) and 0.05% w/w of DBTL and the mixture was stirred at 150° C. for 6 h. A transparent product was obtained which had an OH number of 113 mg KOH/g.

Example 2a

Inventive, Polysiloxane-Modified Polyisocyanate

In a standard stirred apparatus, 321.1 g (1 eq) of Desmodur® N3300 were introduced in 250 g of butyl acetate at 80° C. and blanketed with 2 l/h nitrogen. Subsequently 51.28 g (0.2 eq) of the siloxane block copolyol from Example 1 were added at 80° C. and the temperature was held for 4 h. The theoretically expected NCO content was checked titrimetrically and then the mixture was cooled to room temperature and 250 g of butyl acetate were added. After the theoretical NCO content had been checked, the mixture was cooled to RT and over about 15 min 127.59 g (0.8 eq) of the blocking agent 3,5-dimethylpyrrazol (DMP) were added with regulation of the temperature to a maximum of 40° C. The temperature was held at 40° C. until the NCO peak in the IR spectrometer had disappeared.

A clear, blocked polyisocyanate was obtained, having the following characteristics: solids content 49.6% by weight and also 6.5% blocked NCO content based on DMP. The storage stability at room temperature was >3 months.

Example 2b

Inventive, Polysiloxane-Modified Polyisocyanate

In a standard stirred apparatus, 492.1 g (1 eq) of Desmodur® N3300 were introduced in 250 g of butyl acetate at 80° C. and blanketed with 2 l/h nitrogen. Subsequently 7.86 g (0.02 eq) of the siloxane block copolyol from Example 2a were added at 80° C. and the temperature was held for 4 h. The theoretically expected NCO content was checked titrimetrically and then the mixture was cooled to room temperature and 250 g of butyl acetate were added.

A clear, polysiloxane-modified, polyisocyanate was obtained, having the following characteristics: solids content 50.3% by weight and also 10.4% NCO content. The storage stability at room temperature was >3 months.

Example 2c

Comparative Example Polysiloxane-Modified Polyisocyanate

In a standard stirred apparatus, 295.8 g (1 eq) of Desmodur® N3300 were introduced in 250 g of butyl acetate at 80° C. and blanketed with 2 l/h nitrogen. Subsequently 86.6 g (0.2 eq) of Baysilone OF/OH 502 (OH content 6%) were added at 80° C. and the temperature was held for 4 h. The theoretically expected NCO content was checked titrimetrically and then the mixture was cooled to room temperature and 250 g of butyl acetate were added. After the theoretical NCO content had been checked, the mixture was cooled to RT and over about 15 min 117.6 g (0.8 eq) of the blocking agent 3,5-dimethylpyrrazol (DMP) were added with regulation of the temperature to a maximum of 40° C. The temperature was held at 40° C. until the NCO peak in the IR spectrometer had disappeared.

A clear, polysiloxane-modified, blocked polyisocyanate was obtained, having the following characteristics: solids content 48.6% by weight and also 6.14% blocked NCO content based on DMP.

Example 3a

Comparative Example, Siloxane-Modified Polyol

In a standard stirred apparatus 496.5 g of Desmophen A 870BA were admixed with 3.5 g of the siloxane block copolyol from Example 2a at 80° C. until it was well dissolved. A colourless, storage-stable polyol (>3 months) was obtained which had an OH content of 3.1%, a siloxane block copolyol content of 1%, solid on solid, and a solids content of 70.9%.

Example 3b

Comparative Example, Siloxane-Modified Polyol

In a standard stirred apparatus 482.2 g of Desmophen A 870BA were admixed with 17.8 g of the siloxane block copolyol from Example 2a at 80° C. until it was well dissolved. A colourless, storage-stable polyol (>3 months) was obtained which had an OH content of 3.4%, a siloxane block copolyol content of 5%, solid on solid, and a solids content of 71.7%.

Performance Testing of the Inventive, siloxane-Modified polyisocyanates:

The inventive polyisocyanates from Example 2a and 2b were blended with Desmophen® A870 BA in the NCO/OH ratios of 1.0 and also with 0.1% of Baysilone OL 17 (solid/binder solid, 10% strength solution in MPA), 2.0% of BYK 070 (as-supplied form/binder solid), 1.0% of Tinuvin 123 (as-supplied form/binder solid), 1.5% of Tinuvin 384-2 (as-supplied form/binder solid) and 0.5% of DBTL (solid/binder solid, 10% strength solution in MPA) as coatings additives, and the components were stirred together thoroughly. The solids of the coating materials were between 40 and 50% and where appropriate were adjusted using a 1:1 MPA/SN solvent mixture. Before being processed, the coating material was deaerated for 10 minutes. The coating material was then applied using a gravity-feed cup gun in 1.5 cross-passes to the prepared substrate (3.0-3.5 bar air pressure, nozzle: 1.4-1.5 mm Ø, nozzle-substrate distance: about 20-30 cm). After a flash-off time of 15 min, the coating material was baked at 140° C. for 30 min. The dry film thickness was in each case 40-50 μm.

For the purpose of comparison a conventional coating system comprising Desmophen® A 870 and Desmodur® VP LS 2253, and also coating systems comprising siloxane-modified polyols from Comparative Examples 3a and 3b, were formulated and applied analogously.

The results of the siloxane-containing polyisocyanates of the invention from Example 2a and also of the comparative system are set out in Table 1.

TABLE 1

Comparison of the coatings-technological properties

| | 16 | 8 | 10 |
|---|---|---|---|
| Polyisocyanate | Desmodur VP LS 2253 | Example 2a | Example 2c |
| Polyol | A 870 BA | A 870 BA | A 870 BA |
| Visual assessment of coating film | Satisfactory | Satisfactory | Wetting problems |
| König pendulum damping [s] | 174 | 165 | 95 |
| Solvent resistance (X/MPA/EA/Ac) [rating][1)] after 5 min. Scratch resistance (Hammer test + steel wool) | 3 3 4 4 | 2 2 4 4 | 4 4 5 5 |
| Initial gloss 20° | 88.0 | 87.1 | 86.7 |
| Relative residual gloss after reflow, 2 h 60° C. [%] | 45.8 | 83.1 | 66.4 |

While the polysiloxane-modified polyisocyanates of the invention from Example 2a and 2b formed films with good levelling, polyisocyanates modified with conventional OH-containing polysiloxane units showed severe wetting problems. Furthermore, the polysiloxane-modified polyisocyanate of the invention showed improved solvent resistance and also scratch resistance (relative residual gloss after reflow). Polyisocyanates modified with conventional polysiloxane units showed distinct deterioration in pendulum hardness and also in solvent resistance, even in relation to the standard.
Comparison of the Coatings-Technological Properties with WO2007025671

In Example 3a and 3b, the higher-functionality hydroxyalkyl-functional polydimethylsiloxanes, as in WO2007025671, were first mixed with the polyol, after which they were mixed, prior to application, with the polyisocyanate, and then were applied by spraying and not knife coating, as described in WO 2007/025671. In contradistinction to WO 2007/025671, spray application gave films with severe wetting defects (uncharacterizable), if, on the other hand, the polysiloxane polyol was reacted beforehand, in accordance with the invention, with the polyisocyanate ("prepolymer batching"), then a reasonable spray application could be carried out, which led to improved film properties (see Table 1).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A process for producing a siloxane-modified polyisocyanate, the process comprising:
   providing a polyisocyanate reactant; and
   reacting the polyisocyanate reactant with a hydroxyl-containing siloxane and optionally, a blocking agent, to form a siloxane-modified polyisocyanate, wherein the hydroxyl-containing siloxane has a number-average molecular weight of 200 to 3000 g/mol and an average OH functionality of greater than or equal to 2, and corresponding to the general formula (I):

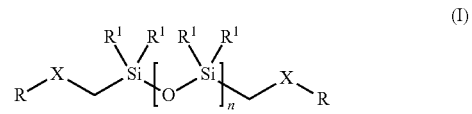

wherein each X independently represents an aliphatic, unbranched or branched $C_1$ to $C_{10}$ radical optionally containing one or more ether groups selected from the group consisting of —[—[O—$CH_2$—CHZ]$_{n'}$—O—]— wherein each Z independently represents an H or a methyl group and n' is 1 to 12, and —[—CH2-O—(CH2)$_r$-]- wherein r is 1 to 4;
wherein each R independently represents a hydroxyl-functional radical selected from the group consisting of: (i) hydroxyfunctional carbon acid ester moieties of the formula (a)

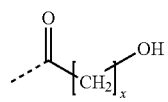

wherein x is 3 to 5; and (ii) hydroxyalkyl-functional amino group of Formula (b)

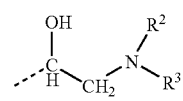

wherein $R^2$ represents a substituent selected from the group consisting of H, methyl, ethyl, n-propyl, iso-propyl, cyclohexyl radicals, 2-hydroxyethyl, 2-hydroxypropyl, and 3-hydroxypropyl, and wherein $R^3$ represents a substituent selected from the group consisting of 2-hydroxyethyl, 2-hydroxypropyl and 3-hydroxypropyl; each $R^1$ independently represents a hydrogen or an optionally heteroatom-containing $C_1$ to $C_{10}$ hydrocarbon radical; and n is 1 to 40.

2. The process according to claim 1, wherein the polyisocyanate reactant is reacted with the hydroxyl-containing siloxane and a blocking agent.

3. The process according to claim 1, wherein the polyisocyanate reactant comprises one or more functional groups selected from the group consisting of uretdione, isocyanurate, allophanate, biuret, iminooxadiazinedione, oxadiazinetrione and combinations thereof.

4. The process according to claim 1, wherein the polyisocyanate reactant comprises one or more compounds prepared from one or more diisocyanates selected from the group consisting of isophorone diisocyanate, diisocyanatodiphenylmethane, diisocyanatotoluene, diisocyanatohexane, and mixtures thereof.

5. The process according to claim 1, wherein $R^1$ represents a phenyl or a methyl group.

6. The process according to claim 1, wherein the polyisocyanate reactant has an amount of free NCO groups, the hydroxyl-containing siloxane of the formula (I) has an amount of NCO-reactive OH groups, and a ratio of the free NCO groups to the NCO-reactive OH groups is 1:0.001 to 1:0.4.

7. The process according to claim 2, wherein free NCO groups in the polyisocyanate reactant are blocked with the blocking agent.

8. The process according to claim 1, wherein reacting the polyisocyanate reactant with the hydroxyl-containing siloxane is carried out in the absence of compounds having two or more hydroxyl groups, other than the hydroxyl-containing siloxane.

* * * * *